United States Patent
Kiel et al.

(10) Patent No.: US 9,764,724 B2
(45) Date of Patent: Sep. 19, 2017

(54) VALVE DEVICE FOR A PNEUMATICALLY OPERATED BRAKE SYSTEM

(75) Inventors: Bernd-Joachim Kiel, Wunstorf (DE); Hartmut Rosendahl, Hannover (DE); Gerd Roters, Wunstorf (DE); Wolfgang Strache, Hemmingen (DE); Otmar Struwe, Hannover (DE)

(73) Assignee: WABCO GMBH, Hannover (DE)

( * ) Notice: Subject to any disclaimer, the term of this patent is extended or adjusted under 35 U.S.C. 154(b) by 216 days.

(21) Appl. No.: 13/883,060

(22) PCT Filed: Aug. 18, 2011

(86) PCT No.: PCT/EP2011/004172
§ 371 (c)(1),
(2), (4) Date: May 2, 2013

(87) PCT Pub. No.: WO2012/059150
PCT Pub. Date: May 10, 2012

(65) Prior Publication Data
US 2013/0221735 A1  Aug. 29, 2013

(30) Foreign Application Priority Data
Nov. 5, 2010  (DE) .......................... 10 2010 050 578

(51) Int. Cl.
*B60T 13/74* (2006.01)
*B60T 13/24* (2006.01)
(Continued)

(52) U.S. Cl.
CPC ............ *B60T 13/24* (2013.01); *B60T 13/662* (2013.01); *B60T 13/665* (2013.01); *B60T 13/683* (2013.01); *B60T 17/228* (2013.01)

(58) Field of Classification Search
CPC .......... B60T 13/26; B60T 13/58; B60T 13/66; B60T 13/68; B60T 13/683; B60T 17/04;
(Continued)

(56) References Cited

U.S. PATENT DOCUMENTS 6,048,040 A * 4/2000 Ross .......................... 303/119.1
6,705,478 B1 * 3/2004 Engle ....................... B60D 1/64
213/1.3

(Continued)

FOREIGN PATENT DOCUMENTS

DE    41 03 694 C2    4/1992
DE    102 25 888 A1   1/2004
(Continued)

*Primary Examiner* — Melody Burch
(74) *Attorney, Agent, or Firm* — Leydig, Voit & Mayer, Ltd.

(57) ABSTRACT

A valve device for a pneumatically-operated vehicle brake system can adjust the pneumatic brake pressure that can be fed to a brake in a controlled manner. A first variant of the valve device is configured as a modulator for use in an electronically regulated embodiment of the brake system; and a second variant is configured for use in a pneumatically controlled embodiment of the brake system. However, both variants have pneumatic interfaces and mechanical fastening points that are configured substantially identically with respect to one another to facilitate conversion of the brake system from one such embodiment to another.

26 Claims, 4 Drawing Sheets

(51) Int. Cl.
*B60T 13/66* (2006.01)
*B60T 13/68* (2006.01)
*B60T 17/22* (2006.01)
*B60T 17/00* (2006.01)

(58) Field of Classification Search
CPC ........... B60T 17/043; Y10T 137/87885; Y10T 137/86493
USPC ..... 303/3, 15, 123, 127, DIG. 10; 188/106 F
See application file for complete search history.

(56) References Cited

U.S. PATENT DOCUMENTS

| | | | |
|---|---|---|---|
| 2005/0099061 A1* | 5/2005 | Hollandsworth | B60T 13/662 303/7 |
| 2006/0284480 A1* | 12/2006 | Rudolph et al. | 303/127 |
| 2010/0078988 A1* | 4/2010 | Bensch et al. | 303/3 |
| 2010/0252378 A1* | 10/2010 | Hilberer | 188/106 F |
| 2011/0005874 A1* | 1/2011 | Beier et al. | 188/106 F |
| 2011/0209787 A1 | 9/2011 | Mann et al. | |
| 2011/0273004 A1 | 11/2011 | Mann et al. | |
| 2011/0303501 A1 | 12/2011 | Hilberer et al. | |

FOREIGN PATENT DOCUMENTS

| | | |
|---|---|---|
| DE | 10 2008 003 381 A1 | 7/2009 |
| DE | 10 2008 047 632 A1 | 3/2010 |
| DE | 10 2008 048 561 A1 | 4/2010 |
| DE | 10 2008 048 562 A1 | 4/2010 |
| EP | 1 733 943 B1 | 4/2010 |
| WO | WO 2010/034476 A1 | 4/2010 |
| WO | WO 2010/034477 A1 | 4/2010 |

* cited by examiner

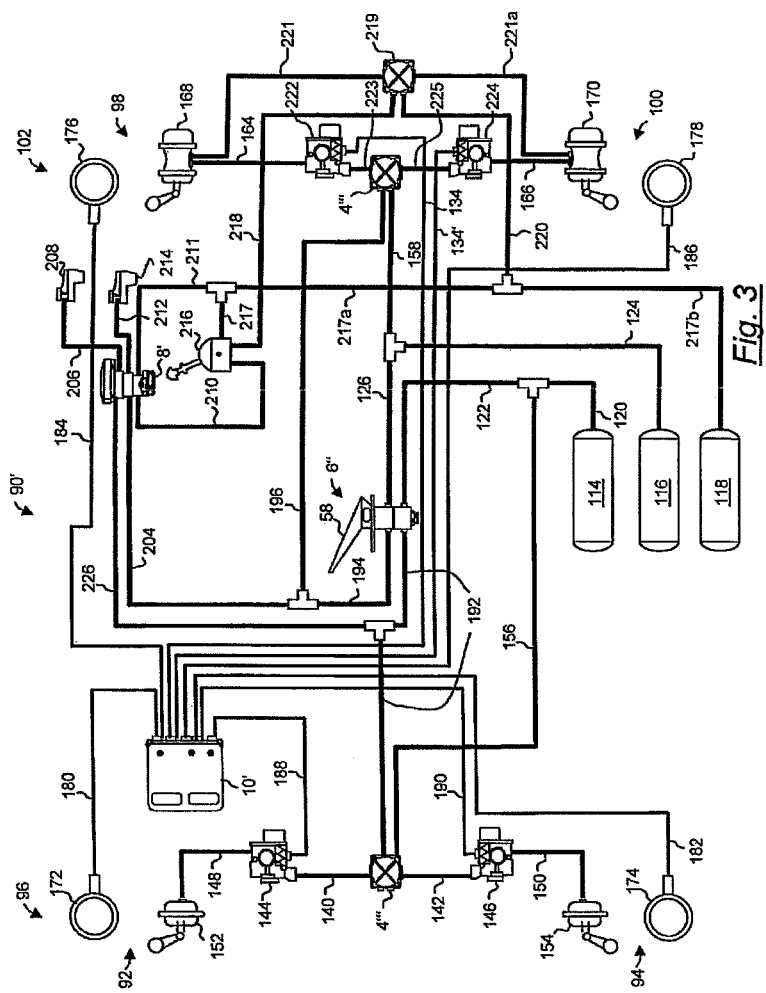

VALVE DEVICE FOR A PNEUMATICALLY OPERATED BRAKE SYSTEM

FIELD OF THE INVENTION

The present invention generally relates to a system having at least one valve device for a pneumatically operated brake system, for example of a motor vehicle, the valve device having at least one valve for adjusting or boosting brake pressure in response to the operation of a brake actuator, for example by means of a foot brake pedal.

BACKGROUND OF THE INVENTION

Different embodiments of vehicle brake systems are known. For example, there are purely pneumatic brake systems; there are anti-lock brake systems (ABS); and there are electronic brake systems (EBS).

With the known purely pneumatic brake system, the brake actuator comprises a brake valve, which in response to operation of the foot brake pedal directly adjusts a pneumatic pressure, namely a target brake pressure, which is supplied to the valve device. The valve device comprises, in this case, a purely pneumatic relay valve, which modifies the brake pressure according to the target brake pressure and possibly provides it with a pneumatic boost relative to the target brake pressure for a rapid response of the brakes.

In the known ABS embodiment, an electronic intervention is made in an otherwise pneumatically controlled braking process and the brake pressure can be maintained or reduced in order to counteract a tendency of a wheel braked by the brake to lock, even when the target brake pressure is increased or not correspondingly reduced. For this purpose the ABS generally comprises electromagnetically controllable ABS valves, which are arranged in the run of the pneumatic line between the valve device and the brake.

Other known ABSs additionally comprise drive slip control (ASR) and/or electronic stability control (ESC). For this purpose, additional solenoid valves are generally provided, with which a brake pressure can be electropneumatically adjusted that exceeds the target brake pressure adjusted by the brake actuator, so that wheels of a drive axle or individual wheels in the case of wheel spin or in the case of a tendency of the vehicle to skid can be braked in a controlled manner.

In the EBS brake system embodiment, which provides a comfortable, electronically controlled braking process, the brake actuator comprises a brake value transmitter, which electronically records a braking value, whereupon a target brake pressure is determined from this brake value by computer. This target brake pressure is electropneumatically adjusted at the valve device, which in this case is a modulator, and is then fed to the brake. For this purpose, the valve device generally comprises a plurality of solenoid valves, which enable the brake pressure at the brake to adapt to the target brake pressure. The valve device comprises at least one pressure sensor for control purposes. Control electronics for this are often arranged directly on the valve device or on the modulator.

The brake actuator of the EBS generally also directly pneumatically adjusts a target brake pressure as a redundant pressure using a brake valve. The EBS or the valve device is designed so that, in the case of a failure of the electronics, the brake pressure at the brake is purely pneumatically adjusted according to this redundant pressure.

The different embodiments of brake systems thus comprise differently designed brake actuators and valve devices. These brake systems also comprise other components, namely an electronic controller and possibly a trailer control valve device for use in a tractor vehicle, which are likewise each designed differently from each other.

Because of the fact that the components of the different known brake systems provide different functionality and, thus, are designed differently, they are also fitted to a vehicle in different manners. This makes both the first fitting and also the conversion of a vehicle costly. In particular, it is very costly to convert a vehicle with an EBS into a vehicle with an ABS (without EBS) or into a purely pneumatic brake system (without ABS).

SUMMARY OF THE INVENTION

It is an object of the present invention to improve the fitting and the replacement of components of a brake system, in particular for flexible fitting with a selected brake system or for the conversion of an EBS into an ABS or into a purely pneumatic brake system.

The invention provides a modular system with components that can be installed in the brake system of a vehicle. The system comprises at least one exchange component in at least two different variants and may contain additional system components, which are the same for all variants of the brake system or have the same functionality. An exchange component of the system is a valve device, which comprises at least one valve and is implemented in a first variant in an EBS or in a variant as a modulator for use in an electronically controlled embodiment of the brake system. The first variant of the valve device is designed such that the valve device adjusts the brake pressure under electronic control according to a brake value generated electrically or electronically as a brake demand signal in response to operation of the brake actuator.

In a second variant, the valve device can be used in an ABS or in a purely pneumatically controlled embodiment of the brake system. In the second variant, the valve device is designed so that the valve device generates the brake pressure pneumatically in response to operation of the brake actuator only according to a target brake pressure adjusted pneumatically by this operation.

Despite the different functionality of the first variant relative to the second variant of the valve device, both variants of the exchange component or of the valve device comprise the same mechanical fixing structure and the same pneumatic interfaces.

Preferably, the fixing structures on the first variant have the same separating distances from each other as the fixing structures of the second variant. It is thus possible to fasten both variants of the valve device to the same fastening points on the vehicle as alternatives to each other.

The invention thus enables the same bores, mountings, pipework and cable looms to be used for EBSs and ABSs and the different valve devices to be mounted on identical mountings on the vehicle in the same way or alternatively. In this way, a simple first fitting of a vehicle with a brake system is possible with low fitting costs. In particular, that is, only a relatively small number of different components have to be provided during fitting despite vehicles that are to be equipped differently. When installing the exchange components, mounting plates and adapters can thus, preferably, be dispensed with or the same mounting plates can be used for the different variants of a respective exchange component.

A simple subsequent conversion of an EBS into an ABS or into a purely pneumatically operated brake system without ABS is also easily possible in this way if, for example, the comfort of an EBS is no longer required for a new application of the vehicle. Thus, any electronic support can be dispensed with when converting and only a pneumatic valve device can be used as an exchange component.

Preferably, for converting the brake systems of a braking system, individual exchange components are exchanged for other variants. However, an EBS generally reverts to a purely pneumatically operated brake system, for example, if an EBS variant of at least one exchange component is replaced by a variant of a pneumatically operated brake system. The remaining EBS variants of the exchange components can preferably also be used like a corresponding pneumatic variant in connection with a pneumatic brake system.

Preferably, variants of the valve device, in particular the first and the second variants, each comprise a valve block or solenoid valve block comprising at least one solenoid valve or a valve cartridge. A valve block here can mean an individual valve or a plurality of valves. In particular, the valve block can either be in the form of a one-piece block or, alternatively, can comprise a plurality of components, in particular one or more housings and individual valves or a plurality of valves in the housing or in the housings. The valve blocks of the different variants are preferably designed such that they can be fixed to one of the housings in an optional mechanical manner, in particular by identical fixing structures. Alternatively or additionally, the valve blocks can be or are pneumatically connected to the housings via identical internal pneumatic interfaces. In particular, the valve blocks have essentially the same dimensions and/or identically arranged pneumatic and/or mechanical connections to a housing of the valve device. The housings of the different variants of the valve device can thus be designed identically or similarly to each other. Here, essentially identical housings also means, for example, housings having identical housing blocks but different housing covers. Thereby, inexpensive housings that are at first identical can be cast for different variants. A potentially necessary adaptation to the different valve blocks or the different functions is possible by means of different bores in the housings or by means of different usage of the bores, so that e.g., for the same ventilation port on the housing, the ventilation can be fed to the valve block at different points and/or to different valves or to the valves on different ports.

Preferably, the first variant of the valve device is designed for use as an axle modulator or wheel modulator in the electronically controlled embodiment of the brake system. In this case, the valve block is preferably in the form of a triple solenoid valve block with three solenoid valves or comprises a plurality of solenoid valves or housings, each with at least one valve or a plurality of valves. By means of the solenoid valves, the brake pressure is adjusted electropneumatically according to the brake value of a brake value transmitter. Moreover, an electronic circuit can increase, maintain or reduce the brake pressure in order to prevent locking of the wheels, in order to prevent spinning of the wheels and/or in order to stabilize the vehicle, even if this is not caused by the brake value or the brake demand signal.

The valve device preferably adjusts the brake pressure pneumatically according to a redundancy pressure in the case of failure of the electropneumatic adjustability. The redundancy pressure is generated by means of a brake valve in addition to the brake value of the brake actuator having the brake value transmitter. In particular, the redundancy pressure is generated directly by operating a foot brake pedal.

The valve device is preferably an axle modulator, with which the brakes on multiple wheels of an axle can be controlled. Alternatively, the valve device is a wheel modulator, which enables the control of an individual brake. The brake system may comprise both an axle modulator for simultaneous braking of the wheels on an axle and also wheel modulators for individual braking of the wheels on a different axle of the vehicle.

The second variant of the valve device for use in the pneumatically controlled embodiment of the brake system is in the form of a wheel modulator in a preferred embodiment. The valve block is in the form here of a triple solenoid valve block with three solenoid valves. Thus, on one hand the brake pressure can be generated pneumatically according to the target brake pressure using the valve device. On the other hand, it is possible to adjust or to maintain a higher or lower pressure using the solenoid valves. In particular, the brake pressure can be adjusted electropneumatically by means of an ABS and/or by means of drive slip control. Downstream solenoid valves, in particular ABS solenoid valves, can thus be dispensed with.

In an alternative embodiment of the second variant, the valve device is in the form of an axle modulator and the valve block is in the form of a single solenoid valve block with a solenoid valve. The solenoid valve allows the brake pressure to increase to above the target brake pressure for drive slip control. By substituting a differential valve, the higher of two pressures can be fed to the brake or an upstream ABS valve. The ABS valve can be a separately arranged standard valve, as is available in many variants. If the solenoid valve has built up an increased pressure because of the drive slip control or in order to prevent wheel spin, this pressure can be reduced again via the ABS valve.

The single solenoid valve block is preferably designed like the described triple solenoid valve block, wherein a dummy body can be used instead of a second and third valve. Alternatively, apertures for a second and third valve can be molded into the valve block.

In a third embodiment of this second variant of the valve device, the valve device is in the form of a relay valve. The brake pressure is thus adjusted purely pneumatically according to the target brake pressure. An electropneumatic intervention is preferably not provided with this embodiment. Preferably, the relay valve thus also has no valve block according to the other two embodiments. Alternatively, however, the relay valve can also be designed with an externally essentially similar valve block or provided with dimensions of the valve block as with the single solenoid valve block and/or the triple solenoid valve block, wherein the valve block preferably comprises no solenoid valves, however, but at least one purely pneumatically operated valve.

Preferably, the valve devices in all embodiments comprise substantially identical housings, wherein air ducts are arranged in the housings, which are switchable or switched differently depending on the respective fitting of the valve device with at least one valve cartridge or at least one valve block. The valve cartridge or the valve block is preferably a solenoid valve cartridge or a solenoid valve block and, thus, each comprises at least one solenoid valve. As an alternative or in addition, the valve block comprises at least one valve replacement body, which instead of a valve contains a volume suitable for accommodating a valve, but is not switchable. Such a volume in the valve block can also be molded with a molding material or a casting material, wherein apertures may remain for an air feed through the valve replacement body.

The valve device is thus differently switchable or switched, so that the air ducts can be or are pneumatically connected to each other differently.

Preferably, the embodiments of the two variants, or at least one embodiment of each of the two variants, thus comprise an identical housing with identical bores or pressure medium ducts, wherein different airways are achieved through different solenoid valve blocks or pilot units and/or different valve cartridges or valves.

Airways in the housing of the valve device are connected differently, preferably depending on the fitting of solenoid valve cartridges or solenoid valve blocks. Thus, large numbers of housings can be produced economically for both variants.

The valve block or the solenoid valve cartridges or the valve arranged therein is preferably molded, in particular with a setting plastic molding material. Elements of the valve block, the solenoid valve cartridge or the valve are permanently fixed relative to each other in an inexpensive manner.

The system preferably comprises one or more other exchange components, each with at least two variants. The other exchange components are the brake actuator and/or a trailer control valve device and/or a control device or an electronic controller.

Preferably, a first variant of the brake actuator comprises a brake value transmitter. The first variant of the brake actuator, a first variant of the trailer control valve device, a first variant of the control device and the first variant of the valve device are designed such that they can be used, in particular together, in the electronically controlled embodiment of the brake system or in the embodiment as an EBS.

A second variant of the brake actuator comprises, by contrast, a brake valve but no brake value transmitter. The second variant of the brake actuator and/or a second variant of the trailer control valve device and/or a second variant of the control device and/or the second variant of the valve device are designed such that they can be used, in particular together, in the pneumatically controlled embodiment of the brake system or in the ABS and/or in a purely pneumatic brake system, possibly without an anti-lock function.

For converting a brake system, the respective variants can thus be exchanged for each other where there is at least one exchange component of the system, preferably however where there is a plurality of exchange components.

Preferably, the variants of the exchange components, in particular the variants of the brake actuator and/or the valve device and/or the trailer control valve device and/or the control device, comprise mechanical fixing points that are designed identically to each other and are arranged identically relative to each other on a respective variant. Alternatively or additionally, the variants of an exchange component or a plurality of exchange components each comprise electrical interfaces that are the same as each other. In addition, the variants of the brake actuator and/or the valve device and/or the trailer control valve device preferably each comprise pneumatic interfaces that are the same as each other.

The same electrical interfaces means any first contact that can be mechanically connected to an identical second contact, wherein in the mechanically connected state there is at least one electrical connection between the first and the second contacts. For example, the first contact is a plug connection and the second contact is a cable plug. Electrical contact points or a pinout of the electrical interfaces can be different in the individual variants of the exchange components. The cable can correspondingly comprise conductors, that are, for example, only used for an EBS or only for an ABS or only for a purely pneumatic brake system. In this case, the same cables can be used for different brake systems. Alternatively, however, the use of different cables or cable looms is possible.

The variants or individual variants of individual exchange components can alternatively comprise the same mechanical fixing points or pneumatic and/or electrical interfaces, whereas the mechanical fixing points or the pneumatic and/or electrical interfaces of other individual exchange components can also be designed differently.

By the same design of the mechanical fixing points or the pneumatic and/or electrical interfaces, a complete EBS can be simply and inexpensively converted into an ABS or a purely pneumatic brake system by exchanging the exchange components. Conversions between other brake systems, which can comprise an identical or different functionality relative to each other and possibly also functionality differing from the EBS and the ABS, are possible by means of the invention.

The brake actuator preferably comprises a brake value transmitter in the embodiment as a first variant and is suitable for use in the electronically controlled embodiment of the brake system or for use in the braking system with the EBS. The brake actuator preferably comprises an electrical interface and pneumatic connections. In one embodiment, a controller or control electronics, in particular the control device, is arranged on the brake value transmitter.

In an embodiment as a second variant of the brake actuator, the brake actuator preferably comprises a brake valve, is suitable for use in the pneumatically controlled embodiment of the braking system or for use in the braking system with the ABS or the purely pneumatic brake system and comprises pneumatic connections. The second variant of the brake actuator preferably does not comprise a control device and in a particular embodiment comprises absolutely no electronics. In another embodiment, a pressure sensor is provided on the brake valve for determining an adjusted target brake pressure and an electrical connection for transmitting the sensed target brake pressure to the brake valve.

Preferably, all variants of the brake actuator comprise a housing of the same form. The variants can thus be exchanged with each other at low cost.

The trailer control valve device is also designed such that, in a first variant, it is suitable for use in the electronically controlled embodiment of the brake system. In the second variant, on the other hand, it is designed such that it is suitable for use in the pneumatically controlled embodiment of the brake system. In particular, with the first variant of the trailer control valve device a trailer brake pressure is electronically monitored.

The control device or the electronic controller in the first variant is suitable for use in the electronically controlled embodiment of the brake system. In the second variant, on the other hand, the control device is designed for use in the pneumatic embodiment of the brake system. Preferably, both variants of the control device comprise an at least externally identical housing. In this case, they can be exchanged for each other particularly easily. Internally, the control devices can be different, but also alternatively can be identical or essentially similar. The controllers can differ from each other, in particular solely by different software or a different mode of operation. In this case, an exchange of the control device during the conversion, e.g., from an EBS to an ABS, can be dispensed with, only, for example, by running different software on the control device or activating a different operating mode.

The inventive system preferably comprises mountings and/or pipes or hoses and/or cables or cable looms as system components. The system components are, in particular in contrast to the exchange components, suitable both for use in the electronically controlled embodiment of the brake system and also for use in the pneumatically controlled embodiment of the brake system. The installation of cables, pipes and hoses can thus also be maintained or adapted, extended or reduced at low cost during an exchange of the exchange components. All variants of the exchange components preferably comprise identically designed fixing points and/or pneumatic and/or electrical interfaces for the connection of these mountings, pipes, hoses and cables or cable looms. In particular, the fixing points comprise apertures and/or holes, in particular threaded holes. The pneumatic interfaces preferably comprise connections for the pipes or hoses. The electrical interfaces preferably comprise plug connections and/or plugs or other electrical contacts.

In one embodiment of the invention, the system comprises components of a brake system, which can be known standard components but expanded by adapters mechanically and/or pneumatically and/or electrically connected to the components. Thus, for example, a known component of a brake system, for example a known valve device of an ABS, can be expanded by means of an adapter such that the adapter provides the same interfaces as the variants of the valve device of the system according to the invention, for example. In this case, the combination of the known components with the corresponding adapter is also understood to be an exchange component of the system according to the invention.

Furthermore, the invention relates to another brake system for a vehicle and the vehicle with at least one of the exchange components of the system according to the invention. Finally, the invention relates to another method for converting a brake system, whereby a brake system is converted by exchanging one or more exchange components, e.g., from an EBS to an ABS. In doing so, existing mountings, cable looms and pipework can continue to be used, so that the method according to the invention for converting is technically simple and inexpensive because of the modular system according to the invention.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

Exemplary embodiments of the present invention are explained in greater detail below with reference to the appended drawings, in which:

FIG. 3 depicts the braking system of FIG. 2 without the electronic brake system with alternative variants of the exchange components of the system of FIG. 1 according to an embodiment of the invention;

DETAILED DESCRIPTION OF THE PREFERRED EMBODIMENTS

Figure 1:
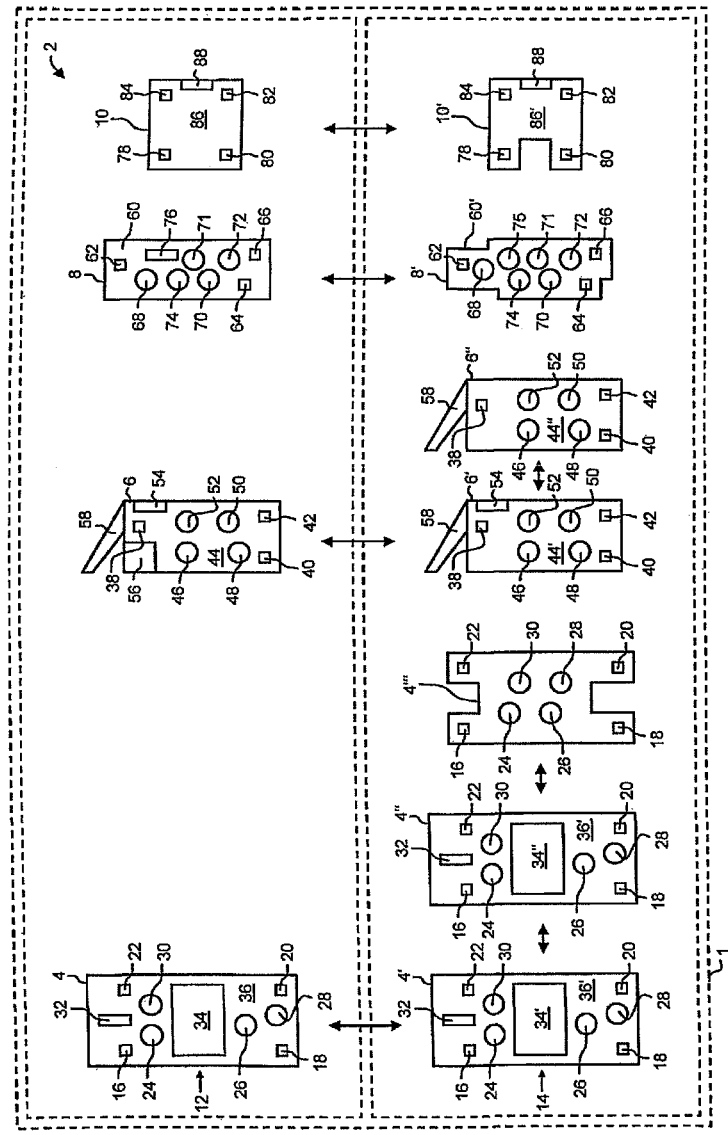
FIG. 1 depicts exchange components of a system for a brake system of a vehicle with a plurality of variants of the exchange components according to an embodiment of the present invention.

FIG. 1 shows a system 1 for a pneumatically operated brake system. The system 1 is of modular construction, in particular as a building block system, and comprises a plurality of exchange components 2. The exchange components 2 are a valve device 4, a brake actuator 6, a trailer control valve device 8 and a control device 10. Of these exchange components 2, the system comprises at least one first variant 12 and at least one second variant 14 respectively. The first and the second variants 12 and 14 of each exchange component 2 can each alternatively be installed in the brake system.

For example, the brake system can initially comprise all exchange components 2 in the first variant 12. All or individual exchange components 2 can, for example, be exchanged for a respective second variant 14 of the respective exchange component 2 for a change of the brake system. An exchange of similarly or identically designed variants 12 or 14 for each other or the exchange of a second variant 14 for another second variant 14 of an exchange component 2 is possible without problems because of the modularity of the system 1. An exchange component 2 may be replaced by more than one exchange component 2 and other components of the system 1. It can also be the case that an exchange component 2 or a plurality of exchange components 2 can be replaced by only one exchange component 2, and in addition other components of the brake system may be omitted.

The first variants 12 of the exchange component 2 are designed or suitable for use in an electronically controlled embodiment of the brake system, i.e., a braking system with EBS. The second variants 14 of the exchange component 2 are, on the other hand, designed for use in a pneumatically controlled embodiment of the brake system, for example for use in a braking system with ABS, or are suitable for this use. In particular, individual or all of the second variants 14 of the exchange components 2 are not suitable for use in an EBS.

The variants 12 and 14 of the exchange components 2 each comprise mechanical fixing points that are designed identically with respect to each other and arranged identically with respect to each other on the respective variant 12, 14. In particular, the valve device 4 comprises mechanical fixing points 16, 18, 20 and 22 on its first variant 12. The second variants 14 of the valve device 4, namely valve devices 4', 4" and 4"', each comprise the same mechanical fixing points 16 through 22 compared to the first variant 12. Here, the arrangement of the fixing points 16 through 22 on the valve device 4 relative to each other is the same as their arrangement relative to each other on the valve device 4', 4" and 4"'. Thus, it is possible to mechanically fix the valve devices 4, 4', 4" and 4' or the different variants 12 and 14 of an exchange component 2 to the same frame components, mountings or other accommodating structures. For example, the mechanical fixing points 16 through 22 can be apertures or holes or drilled holes with or without threads, so that the exchange components 2 can be bolted to a vehicle frame, for example by means of bolts.

The valve device 4 also comprises pneumatic interfaces 24, 26, 28 and 30. Each pneumatic interface 24 through 30 is suitable for the supply and/or discharge of compressed air. If, for example, an interface 24 through 30 does not directly vent compressed air to the surroundings, it can be pneumatically connected by a pipe, hose or a different compressed air carrying means. The valve devices 4', 4" and 4' comprise the same pneumatic interfaces 24 through 30. The arrangement of the interfaces 24 through 30 relative to each other is preferably the same for the differently designed valve devices 4 through 4' or variants 12 and 14 of the valve devices 4 through 4", but can also be different. In the example embodiment shown, the interfaces 24 through 30 of the valve device 4 are arranged relative to each other the same as the interfaces 24 through 30 of the valve device 4' or 4" are arranged relative to each other. The arrangement of the interfaces 24 through 30 of the valve device 4' relative to each other differs from this, on the other hand.

The pneumatic interface 24 of the second variants 14 of the valve device 4 or of the valve device 4', 4" or 4''' is an input for a target brake pressure generated pneumatically, e.g., by means of a brake pedal. In the EBS or in the first variant 12 of the valve device 4, the target brake pressure is delivered as a redundant pressure via the pneumatic interface 24 of the valve device 4.

The pneumatic interface 30 is provided for pneumatic connection to at least one brake of the vehicle having the brake system with exchange components 2 of the system 1. The first variant 12 of the valve device 4 adjusts the brake pressure provided at this pneumatic interface 30, preferably electropneumatically or by means of at least one solenoid valve. In the event of a failure of the electropneumatic adjustment capability or an electrical failure of the EBS of the braking system, the brake pressure is adjusted pneumatically according to the redundant pressure. The second variants 14 of the valve device 4 or the valve devices 4', 4" and 4' also adjust the brake pressure pneumatically according to the target brake pressure and provide it to the pneumatic interface 30.

The pneumatic interface 26 or 28 is provided in each case for pneumatic connection to a compressed air reservoir or to a vent. The interface 28 or a pneumatic connection for venting can also be dispensed with for valve device 4", because the venting takes place in this case by means of a downstream ABS valve.

The valve devices 4, 4' and 4" each comprise at least one solenoid valve (not illustrated) for electrical control and/or an identically designed electrical interface 32 for electrical connection of a pressure sensor. In particular, the electrical interfaces 32 comprise identical plug connectors or plugs, so that a cable laid on the vehicle frame can be connected by means of the electrical interface 32 to the valve device 4 or alternatively to the valve device 4' or 4".

The valve devices 4, 4' and 4" also comprise a valve block 34, 34' or 34" having in each case at least one solenoid valve. The valve blocks 34 through 34" are at least externally preferably identically designed or similarly designed such that they can be mechanically fixed to or in each housing 36 or 36' or a group of housings of the valve devices 4 through 4". The housings 36 and 36' are suitably designed identically or similarly with respect to mechanical interfaces to the valve blocks 34 through 34". This has manufacturing technological advantages. Preferably, electrical and/or pneumatic interfaces between one of the housings 36 and 36' and the respectively associated valve block 34 through 34" are designed similarly.

It can thus be sufficient to obtain different configurations of the brake system, to fit the valve blocks 34 through 34" with different valves and possibly to provide other different configurations inside the valve blocks 34 through 34". Externally, the valve blocks 34 through 34" can, however, be designed identically to each other. The housings 36 through 36' of the valve devices 4 through 4" are preferably adapted to the different manner of operation of valve blocks 34 through 34" by different air feeds or bores in the housings 36 through 36', so that, for example, the pneumatic interface 26 on the valve device 4 can be pneumatically connected to the valve block 34 or 34' via a different interface between the housing 36 or 36' and the valve block 34 or 34' compared to the pneumatic interface 26 of the valve device 4'. A pneumatic connection can thus be achieved for valve block 34 to a different valve or a different input of an identical valve compared to valve block 34'.

The valve devices 4, 4' and 4" are in the form of modulators and can be used as axle modulators for the adjustment of brakes on a plurality of wheels of an axle or as wheel modulators for the adjustment of the brake pressure on brakes of individual wheels or individual sides of an axle. The valve device 4''' is, on the other hand, in the form of a relay valve and is preferably used for the pneumatic adjustment of the brake pressure for brakes on wheels of one axle. ABS valves may be arranged upstream of the individual brakes of the wheels, which in the event of a tendency to locking of the respective wheel can electropneumatically limit or reduce the brake pressure to a lower pressure compared to the brake pressure adjusted by the relay valve.

The brake actuator 6 as another exchange component 2 of the system 1 also comprises identical or identically designed mechanical fixing points 38 or 40' or 42 in the first variant 12 compared to the second variant 14 or compared to the brake actuator 6' or 6", which are arranged, moreover, identically to each other on the respective brake actuator 6, 6'. In particular, housings 44, 44' and 44" of the brake actuators 6, 6' and 6" are designed essentially identically or at least similarly to each other. Moreover, the brake actuators 6, 6' and 6" comprise identical pneumatic interfaces 46, 48, 50 and 52, so that they can be pneumatically connected to identical compressed air hoses or compressed air lines.

The brake actuators 6 and 6' also preferably comprise an identical electrical interface 54. In the first variant or EBS variant of the brake actuator 6, the electrical interface 54 is electrically connected to signal processing electronics 56. In particular, in this case the brake actuator 6 comprises a brake value transmitter, which in response to the operation of a brake pedal 58 detects a deceleration demand electronically, in particular by means of a Hall sensor or detector, which, following electronic signal processing, is passed on via the electrical interface 54 to the control device 10 or to the valve device 4. In addition, the redundant pressure is generated directly pneumatically, wherein two of the pneumatic interfaces 46 through 52 are used for connection to the compressed air reservoir of two brake circuits. The two other pneumatic interfaces 46 through 54 each provide the redundant pressure for one of the two brake circuits.

Analogously to the adjustment of the redundant pressure, the target brake pressure in the brake actuators 6' and 6" comprising a brake valve, but no brake value transmitter, is adjusted and provided pneumatically. The electrical interface 54 for the brake actuator 6' additionally allows the connection of a pressure sensor, which detects the adjusted target brake pressure in the brake actuator 6', if the target brake pressure is generated pneumatically by operation of the brake pedal 58. By operation of the brake pedal 58 of the brake actuator 6", the adjusted target brake pressure may be measured at different points of the brake system, e.g., in the valve device 4' or 4".

The trailer control valve device 8 as a first variant 12 comprises, in the example embodiment shown here, a housing 60 for the second variant 14 or for a trailer control valve device 8' that is designed differently compared to a housing 60' of the second variant 14. Nevertheless, both housings 60 and 60' each comprise identical or identically designed mechanical fixing points 62 or 64 or 66, wherein the mechanical fixing points 62 through 66 are arranged relative to each other on the housing 60 like the mechanical interfaces 62 through 66 are arranged relative to each other on the housing 60'. Alternatively, the housings 60 and 60' can also be designed identically to each other.

The trailer control valve devices 8 and 8' also comprise identical pneumatic interfaces 68 or 70 or 71 or 72 or 74, via which an operating brake pressure and a parking brake pressure for a parking brake can be provided to a trailer by the brake system. The trailer control valve device 8' also comprises another pneumatic interface 75. The first variant 12 of the trailer control valve device 8 also comprises an electrical interface 76, via which a variation of the operating brake pressure and/or parking brake pressure for the trailer can be influenced electropneumatically and/or via which at least one of these two pressures can be provided to the at least one pressure sensor for measurement and/or via which the trailer control valve device 8 can be electrically controlled and/or monitored.

The control device 10 or 10' is preferably a controller or an electronic circuit, which performs control functions. In the illustrated example embodiment, the control devices 10 and 10' or the first and the second variant 12, 14 comprise identical or respectively identically designed mechanical fixing points 78 or 80 or 82 or 84, although a housing 86 of the control device 10 is designed differently to a housing 86' of control device 10'. As above with the other exchange components 2, here too the mechanical fixing points 78 through 84 are arranged relative to each other on the controller 10 as these mechanical fixing points 78 through 84 are arranged relative to each other on the controller 10', so that mechanically a simple exchange of the control device 10 for the control device 10' is possible. In addition, for example by means of a plug connection, the electrical connection to a cable or a plurality of cables or a cable loom only has to be made via an identical electrical interface 88, which however can have different electrical contacts, e.g., in an externally identically designed plug or an externally identically designed plug connector. Identical electrical interfaces 88 on the controllers 10 and 10' enable, for example, an exchange of the controllers 10 and 10' for each other, without the cable or cable looms on the vehicle having to be replaced.

The illustrations of the exchange components 2 are only to be viewed as examples. The exchange components 2 are shown highly simplified. In particular, the mechanical fixing points, pneumatic interfaces and electrical interfaces are only illustrated symbolically as circles, squares or rectangles, wherein their actual configuration may generally deviate therefrom. The number of the interfaces and their arrangement on the respective housing may in general differ from example embodiments used only for illustration of the invention. In any case the first variant and the second variants of the exchange components 2 respectively can be exchanged for each other without problems, e.g., to exchange an EBS for an ABS or a purely pneumatic brake system without anti-lock functionality. In the original equipment of a vehicle, at least substantially identical pipework with pneumatic pipes or compressed air lines, identical mechanical fixing points and identical electrical cabling can also be provided, wherein preferably only different exchange components have to be installed for the different brake systems.

Figure 2:
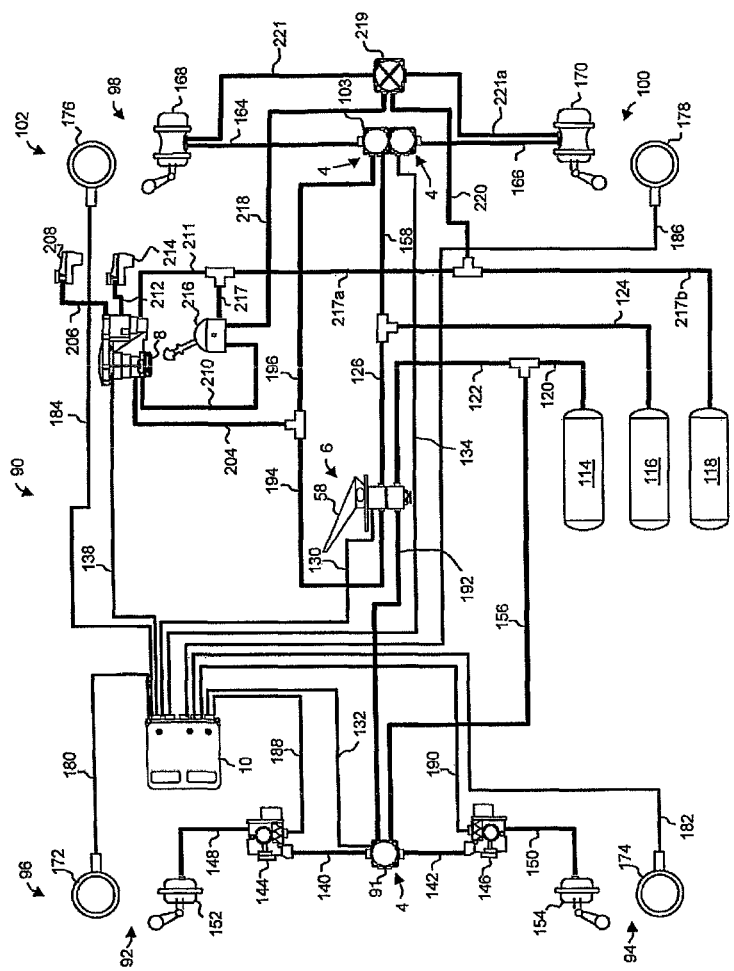
FIG. 2 depicts a braking system of a vehicle having an electronic brake system with exchange components of the system of FIG. 1 according to an embodiment of the invention.

FIG. 2 shows a brake system 90 according to an example embodiment of the invention in an EBS form. The brake system 90 comprises the first variants 12 of the exchange components 2 of the system 1 of FIG. 1. In particular, the brake system 90 comprises the valve device 4 in the form of a modulator three times, namely once in a form as a 1-channel axle modulator 91 for operating brakes 92 and 94 on a front axle 96 of a vehicle that comprises the brake system 90. Other valve devices 4 are provided as wheel modulators respectively for a brake 98 or 100 on a rear axle 102 of the vehicle and combined in a 2-channel axle modulator 103. Moreover, the brake system 90 comprises the brake actuator 6 having a brake value transmitter with the brake pedal 58, the trailer control valve device 8 and the control device 10 in the form of a control unit.

The control device 10 carries out central control functions of the electronic brake system, so that it is a central controller of the electronic brake system at the same time. The control device 10 and all other electrical and electronic components of the brake system 90 are supplied with electrical energy by at least one vehicle battery.

The brake system 90 is constructed with three brake circuits, which are supplied from three compressed air storage containers 114, 116 and 118 and in turn obtain compressed air from at least one compressor (not illustrated), preferably after processing in a compressed air processing device and preferably via a four-circuit safety valve. The brakes 92 and 94 on the front axle 96 can be operated by means of the first brake circuit and the brakes 98 and 100 on the rear axle 102 of the vehicle and the brakes of an attached trailer can be operated by means of the second brake circuit. A third brake circuit supplied from the compressed air storage container 118 is provided for operation, in particular release, of a parking brake.

Compressed air from the compressed air storage containers 114 and 116 is provided via compressed air lines 120 and 122 or 124 and 126 to the brake pedal device 6. In response to operation of the brake pedal 58, the brake pedal device 6 or the brake value transmitter generates an electrical brake demand signal, which is passed via the electrical interface 32 according to FIG. 1 to an electrical line 130 and via the electrical line 130 and further via the electrical interface 88 to the control device 10. Moreover, the brake actuator 6 directly adjusts a redundant pressure for the two brake circuits and provides it via two of its pneumatic interfaces 46 through 52.

The control device or controller 10 is electrically connected via electrical lines 132, 134 and 138 to the valve devices or modulators 4 or to the trailer control valve device 8. The controller 10 can thus carry out control functions, or in connection with sensors regulating functions for the components of the brake system 90 controlled by it or for the valve devices 4 and for the trailer control valve device 8.

In response to the brake demand signal, the controller 10 controls the valve devices 4 so that they adjust a brake pressure, which the controller 10 computes or selects according to the brake demand signal and possibly depending on other parameters. Pressure sensors in the valve devices 4 measure the adjusted brake pressure, pass on the measurement results via the electrical line 132 or 134 to the controller 10, so that there is feedback and the brake pressure can be adjusted by the controller 10. An electronic circuit for controlling or adjusting the brake pressure is thus contained in the controller 10. This has the advantage that both the first variant 12 and also the second variants 14 of the valve device 4, for which the electronic circuit is not required, do not have to comprise any control electronics or regulating electronics and can thus be designed very similarly to each other. Alternatively, a portion of or the entire electronic circuit for adjusting the brake pressure can be arranged on the valve device 4.

The brake pressure adjusted by the valve device 4 or the 1-channel axle modulator 91 on the front axle 96 is initially provided via a compressed air line 140 or 142 to an ABS valve 144 or 146 for an anti-locking function and then via a compressed air line 148 or 150 to a brake cylinder or the membrane part of a brake cylinder 152 or 154. The brakes 92 and 94 can be operated by means of the brake cylinders 152 and 154. The compressed air for this is provided to the valve device 4 on the front axle 96 of the vehicle from the first brake circuit via a compressed air line 156.

A compressed air line 158, on the other hand, supplies the valve devices 4 or the 2-channel axle modulator 103 on the rear axle 102 of the vehicle with compressed air from the second brake circuit. The brake pressure adjusted by the valve devices 4 on the rear axle 102 of the vehicle analogously to the adjustment of the brake pressure by means of the valve device 4 on the front axle 96 is provided via a compressed air line 164 or 166 to a membrane part of a combined spring brake cylinder 168 or 170.

The brake system 90, moreover, provides functions of an anti-lock brake system, drive slip control and electronic stability control. Revolution rate information of the individual wheels of the vehicle during travel and during the braking process is required for this purpose. The brake system 90 thus comprises wheel sensors 172, 174, 176 and 178, which sense wheel revolution rates of the individual wheels and pass measurement values or information about the sensed wheel revolution rates to the controller 10 by means of an electrical line 180, 182, 184 or 186.

The anti-locking function is intended to counteract a tendency to locking of the wheels. If a tendency to locking of a wheel is detected on the rear axle 102 of the vehicle, then the valve device 4 associated with this wheel is controlled via the electrical line 134 to release the brake 98 or 100 or to vent the membrane part of the combined spring brake cylinder 168 or 170 via the compressed air line 164 or 166 or to reduce the pneumatic pressure in the respective membrane part. On the front axle, on the other hand, to release the brake 92 or 94 in the event of a detected tendency to locking, the ABS valve 144 or 146 is controlled by the controller 10 via an electrical line 188 or 190. In response to this the ABS valve 144 or 146 vents the compressed air line 148 or 150 or at least increases the pressure therein no further.

Even if an impending or actual loss of stability or a tendency to skidding of the vehicle is detected by means of the electronic stability function, the ABS valves 144 and 146 and the valve devices 4 on the rear axle 102 of the vehicle can be controlled selectively in order to influence the pressure in the compressed air lines 148, 150, 164 and 166 as for the ABS function described.

Likewise for the electronic stability function and additionally for the drive slip control, the pressure in the compressed air lines 148, 150, 164 and 166 can be selectively increased. In the case of drive slip control, the controller 10 detects slipping of the wheels by means of the sensed wheel revolution rates and possibly by means of other data and therefore controls the valve devices 4 to brake the wheels so as to counteract the slip or to prevent spinning of the wheels. During this, both wheels on the rear axle 102 can be braked independently of each other. On the front axle 96, on the other hand, the valve device 4 or the 1-channel axle modulator 91 is responsible for the braking of both wheels. The simultaneous braking of both wheels on the front axle 96 is advantageous in order to keep the vehicle steerable despite the electronic intervention. However, the brakes 92 and 94 on the wheels of the front axle 96 can also be subjected to brake pressures that are different from each other because of the ABS valves 144 and 146. In this example embodiment, two valve devices 4 as wheel modulators are provided together as the 2-channel axle modulator 103 on the rear axle 102, but only one valve device 4 is provided as the 1-channel axle modulator 91 together with the two ABS valves 144 and 146 on the front axle 96 of the vehicle.

In an alternative embodiment, however, two valve devices 4 in the form of wheel modulators or a 2-channel axle modulator can also be provided on the front axle instead of the valve device 4 used as a 1-channel axle modulator with the two ABS valves 144 and 146. In this case, it is, however, effective for drive slip control or possibly also for electronic stability control to simultaneously control the valve devices 4 on the front axle 96 at least for drive slip control or to adjust an identical brake pressure by means of the valve devices 4.

The valve device 4 on the front axle 96 is supplied with the redundant pressure adjusted by means of the brake actuator 6 in the first brake circuit via a compressed air line 192 for pneumatic control of the brake pressure in the case of redundancy. The valve devices 4 on the rear axle 102 receive the adjusted redundant pressure from the second brake circuit analogously via compressed air lines 194 and 196. In the event of an electrical failure or in the event of electronic failure, the valve devices 4 adjust the brake pressure in the compressed air lines 148, 150, 164 and 166 in a purely pneumatic manner according to the respective redundant pressure in the first or second brake circuit, so that the vehicle comprising the brake system 90 can be braked pneumatically.

The brake system 90, moreover, controls any brakes on a trailer. Via a compressed air line 204 the redundant pressure from the second brake circuit is connected to the trailer control valve device 8 via one of the pneumatic interfaces 68 through 74 according to FIG. 1. Via another of the interfaces 68 through 74, another compressed air line 206 is connected, which provides the redundant pressure to a compressed air connector 208, which can be connected to pneumatic systems of the trailer. Compressed air lines 210, 211 and 212 are connected via the other three pneumatic interfaces 68 through 74 of the trailer control valve device 8. An adjusted reservoir air pressure can be drawn from the third brake circuit via the compressed air line 210 and a reservoir air pressure can be drawn directly from the third brake circuit via the compressed air line 211 and provided via the compressed air line 212 to a compressed air connector 214 for connection to compressed air systems of the trailer. The compressed air with the adjusted air pressure is thereby drawn via a parking brake actuator 216, which in turn draws the reservoir air pressure from the third brake circuit via compressed air lines 217, 217a and 217b. Electrical control and monitoring of the trailer control valve 8 is carried out via the electrical line 138.

A parking brake function of the brake system 90 can be controlled by means of the parking brake actuator 216. The parking brake function can be activated and deactivated by the parking brake actuator 216 separately for the vehicle and for the trailer that may be coupled to the vehicle. The compressed air supply is performed from the third brake circuit. For applying or releasing the parking brake function, spring storage parts of the spring brake cylinders 168 and 170 are vented or ventilated. The parking brake actuator 216 provides the adjusted parking brake pressure via a compressed air line 218 to a relay valve 219, which boosts the air pressure with compressed air drawn via a compressed air line 220 and provides it via compressed air lines 221 and 221a to spring storage parts of the combined spring brake cylinders 168 and 170 for releasing the parking brake.

FIG. 3 shows a brake system 90' or the brake system 90 of FIG. 2 in an embodiment with exchange components 2 of the second variant 14. The brake system 90' is in the form of an ABS or comprises a pneumatic brake system in which an anti-lock system function can intervene electronically in a braking process. However, the ABS comprises no electronic brake system in the sense that an electrical brake demand signal from the brake actuator 6" would be transferred to the control device 10'.

In many parts, the brake system 90' is thus identical to the brake system 90 of FIG. 2. In particular, the same reference numbers designate the same components. The differences of the brake system 90' compared to the brake system 90 are described below by the exchange according to the invention of the exchange components 2 of the system 1.

In particular, the brake system 90' comprises the brake actuator 6" of FIG. 1 having the brake valve, but no brake value transmitter. By operating the brake pedal 58, a target brake pressure is thus adjusted in the first and in the second brake circuit analogously to the adjustment of the redundant pressure in the brake system 90 according to FIG. 2. In contrast, no braking value is sensed electronically, but the adjusted target brake pressure may be measured. Thus, instead of the valve device 4 on the front axle 96 in the form of a 1-channel axle modulator 91, the purely pneumatic valve device 4''' in the form of a relay valve is provided, which is a second variant of the exchange component 2.

In an alternative embodiment, in particular in a brake system with lower requirements on a response characteristic of the brakes, the valve device 4''' can also be omitted. In this case, the ABS valves 144 and 146 provide compressed air directly or not into the volume of air boosted by the brake pedal device 6". The ABS valves are controlled via the electrical lines 188 and 190 in this alternative, as also in the illustrated example embodiment. In the event of a detected tendency to locking of the wheels on the front axle 96, the brakes on the wheels can be released individually by means of the ABS valves 144 and 146.

On the rear axle 102 a single valve device 4''' in the form of a relay valve is likewise provided instead of the two valve devices 4 or instead of the 2-channel axle modulator 103, but wherein the valve device 4' for each wheel to be braked is followed by an ABS valve 222 connected via a compressed air line 223 and an ABS valve 224 connected via a compressed air line 225, so that the brakes 98 and 100 on the rear axle 102 can be released individually, as with the brake system 90 in the event of a detected tendency to locking. Control of the ABS valves 222 and 224 is conducted via the electrical line 134 or via an electrical line 134'.

For an at least partial conversion of the brake system 90 to brake system 90' or for alternatively equipping a vehicle with a brake system, the valve device 4''' takes the place of the 2-channel axle modulator 103 with the valve devices 4 or the place of one of the valve devices 4. Places are already provided on the vehicle for the ABS valves 222 and 224 as standard, which are not occupied in the brake system 90, but at which the ABS valves 222 and 224 can be mounted for conversion to the ABS. Electrical interfaces on the ABS valves 222 and 224 are preferably of identical form to the electrical interfaces 32 on the valve devices 4, so that the electrical line 134 or 134' can be connected to the ABS valve 222 or 224 instead of the respective valve device 4.

Moreover, the electrical connection 138 between the controller 10' according to FIG. 1 provided instead of the controller 10 and the trailer control valve device 8' provided instead of the trailer control valve device 8 of FIG. 1 is omitted in the brake system 90' compared to the brake system 90 of FIG. 2. That is, the electrical control and monitoring of the trailer control valve device 8' can be omitted in the ABS. For this purpose, the trailer control valve device 8' is also supplied with the adjusted air pressure from the first brake circuit via a compressed air line 226 and via the other pneumatic interface 75 according to FIG. 1.

The valve devices 4" of FIG. 1 can also be provided instead of the valve devices 4''' on the front axle 96 or on the rear axle 102. In this case, the brake system comprises electrical lines according to FIG. 2 for controlling the valve devices 4". It is thus also possible to adjust a brake pressure electropneumatically, even without an electronic brake demand signal, namely not as a response to operation of the brake pedal 58, but in response to an electronic intervention by the controller 10' or by an alternatively installed controller. With this brake system differing from the illustrated brake system 90', it is thus possible to also provide drive slip control and an electronic stability function.

According to another embodiment that builds upon the example embodiment according to FIG. 3, the ABS valves 144, 146, 222 and 224 and also possibly the wheel sensors 172 through 178 can also be omitted, so that the brake system 90 or the EBS can also be converted to a purely pneumatic brake system without anti-locking functionality. Here a controller, in turn differing from the controller 10 or 10' and in the form of a second variant 14, or the controller 10 or 10' may be suitably reprogrammed or switched over.

In another embodiment, the valve devices 4 on the rear axle 102 of the vehicle are replaced by the valve devices 4' according to FIG. 1 for conversion of the EBS or the brake system 90 of FIG. 2 to an ABS. For an anti-locking function, for drive slip control and for electronic stability control, the valve devices 4' enable specific individual ventilation or venting of the compressed air line 164 or 166 to the spring brake cylinder 168 or 170 in the case of an electronic intervention by the controller 10' or by an alternatively used controller independently of a manually adjusted target brake pressure or with priority over the adjusted target brake pressure.

In this embodiment, two further valve devices 4' are also provided on the front axle 96, which replace the valve device 4 and the ABS valves 144 and 146 of the brake system 90 according to FIG. 2. The function of the valve devices 4' on the front axle 96 is the same as the function of the valve devices 4' on the rear axle 102 of the vehicle. In the case of a conversion, one of the valve devices 4' takes the place of the valve device 4 according to FIG. 2. The second valve device 4' on the front axle 96 is mounted on a place that is already provided in the vehicle having the brake system 90 of FIG. 2.

In one embodiment, the mechanical fixing points of the valve devices 4 through 4''' or mechanical fixing points of the ABS valves 144, 146, 222 and 224 can be designed such that a valve device 4 through 4' can also be mounted on the vehicle instead of an ABS valve, or, conversely, an ABS valve 144, 146, 222, 224 can be mounted on the mounting point of a valve device 4 through 4'.

For simple conversion, pipework or pressure hoses and electrical lines can also be dimensioned with sufficient length so that, for example, the electrical lines 134 and 134' can reach both the valve devices 4 on the rear axle 102 of the brake system 90 of FIG. 2 and also the ABS valves 222 and 224 of the brake system 90' according to FIG. 3. Alternatively, extensions or adapters can also be provided.

Figures 4, 5, 6:
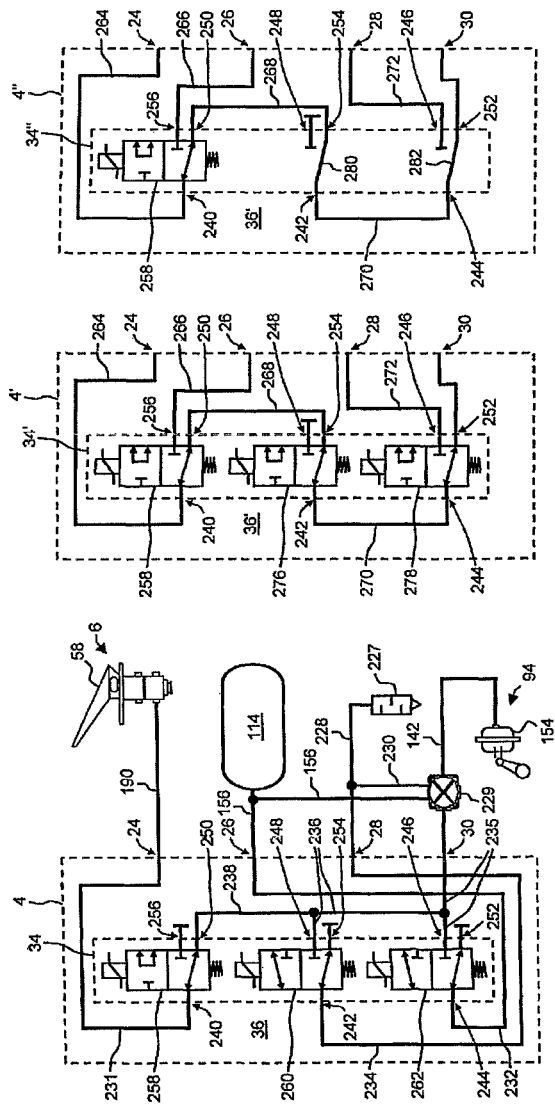
FIG. 4 depicts a first variant of the valve device of the system of FIG. 1 with a first type of valve block according to an embodiment of the invention.
FIG. 5 depicts a second variant of the valve device of the system of FIG. 1 with a second type of a valve block according to an embodiment of the invention.
FIG. 6 depicts a further second variant of the valve device of the system of FIG. 1 with the housing of the valve device of FIG. 5 and with a third type of valve block according to an embodiment of the invention.

FIG. 4 shows the first variant 12 of the valve device 4 of the system 1 of FIG. 1 with the valve block 34 and with connections to the brake actuator 6, to the compressed air storage container 114, to a vent 227 and to the brake cylinder 154, respectively, via the compressed air line 190 or 156 or a compressed air line 228 or the compressed air line 142 in a reduced or simplified illustration in comparison to FIG. 2. The valve device 4 also has an associated relay valve 229, which is illustrated here as outside the housing 36. However, the housing 36 usually also comprises the relay valve 229. The relay valve 229 is pneumatically connected to the vent 227 via a compressed air line 230. The compressed air lines 190, 156, 228 and 142 are pneumatically connected to the valve device 4 via the pneumatic interfaces 24 through 30. The housing 36 of the valve device 4 comprises compressed air lines 231, 232, 234, 235, 236 and 238, which are at least partly in the form of bores in the housing 36. The compressed air lines 231-238 are pneumatic connections between the pneumatic interfaces 24 through 30 and the valve block 34. Pneumatic connections between the compressed air lines 231-238 and the valve block 34 are thereby internal pneumatic interfaces 240, 242, 244, 246, 248 and 250. Moreover, if there are other internal pneumatic interfaces 252, 254 and 256 between the housing 36 of the valve device 4 and the valve block 34, they may also be omitted.

The electrical interface 32 according to FIG. 1 is electrically connected to the valve block 34 via electrical lines to an internal electrical interface to this valve block 34. Alternatively, the valve block 34 can also directly comprise the electrical interface 32. The valve block 34 comprises three solenoid valves 258, 260 and 262, which can thus be electrically controlled. By means of the three solenoid valves 258 through 262, the valve device 4 can provide redundancy, ventilating/venting and maintaining functions.

The illustration shows the solenoid valves 258 through 262, each being in the no-current state. In this case, the pneumatic interface 24 is pneumatically connected to the pneumatic interface 30 via the solenoid valve 258, so that the brake 94 can be operated according to the redundant pressure adjusted by means of the brake pedal device 6.

In the normal case, i.e., with normal operation of the EBS, by contrast, the solenoid valve 258 is carrying current and the pneumatic interface 24 is thus separated from the pneumatic interface 30. In this case, the pneumatic interface 30 can be pneumatically connected to the vent 227 by passing current through the solenoid valve 260 or can be pneumatically connected to the compressed air storage container 114 by passing current through the solenoid valve 262, so that a brake pressure in the compressed air line 142 demanded according to the brake demand signal can be electropneumatically adjusted.

The triple solenoid valve block 34 also comprises a pressure sensor, which can be connected to the controller of the brake system via the electrical interface 32 or via a further electrical interface.

FIG. 5 and FIG. 6 show the second variants 14 alternative to the valve device 4 according to FIG. 4, namely the valve devices 4' and 4" of FIG. 1 provided for an ABS. The housings 36' and 36" of the valve devices 4' and 4" are identical or at least of such similar form to the housing 36 of the valve device 4 that they can be alternatively mechanically installed in the same brake system. In particular, the housings 36, 36' and 36" comprise the same mechanical fixing points 16 through 22 and the same electrical interface 32.

The pneumatic interfaces 24 through 30 of the valve device 4 of FIG. 4 are provided for the valve device 4' or 4", are of the same design and are arranged in the same way. One form of the valve blocks 34' and 34" enables a similar mechanical attachment in one of the housings 36 through 36" and/or identical internal pneumatic interfaces to one of the housings 36 through 36" in the illustrated example embodiment. Alternatively, however, the valve blocks can also differ from each other in respect of these features.

The housings 36 and 36' comprise identically designed internal interfaces to the respective valve block 34, 34' or 34" that are also arranged identically relative to each other. The valve devices 4 through 4" or the housings 36 and 36' of the valve devices 4 through 4" can thus initially be manufactured in the same way. In a further production step, the housings 36 and 36' are then provided with different bores or different compressed air lines. In this way, it is possible, despite the substantially identical production process of the valve devices 4 through 4", to provide different functionalities of the valve devices 4 through 4". In particular, the housing 36' of the valve device 4' of FIG. 5 or of 4" of FIG. 6 comprises compressed air lines 264, 266, 268, 270, 271, 272 and 274 that run differently compared to the pressure lines of the valve device 4 of FIG. 4.

The valve block 34' thus differs from the valve block 34 in that, instead of the solenoid valves 260 and 262, solenoid valves 276 and 278 are provided, which are designed identically to each other and identically to the solenoid valve 258. In the no-current state of the three solenoid valves 258, 276 and 278, as for the valve device 4, the pneumatic interface 24 is pneumatically connected to the pneumatic interface 30, so that a brake can be operated with the target brake pressure adjusted by the brake pedal 58.

By electrical control of the solenoid valves 258, 276 and 278, the functions of an anti-lock brake system, electronic stability control and drive slip control can be provided. These functions necessitate the control or maintenance of a brake pressure that is higher or lower than the adjusted target brake pressure. The brake pressure provided at the pneumatic interface 30 is thus increased by passing current through the solenoid valve 258, is maintained by passing current through the solenoid valve 276 or is reduced by passing current through the solenoid valve 278. The valve device 4' can, consequently, be used on all wheels of a vehicle without additional ABS valves. Thus, large quantities of the valve device 4 can be produced, which makes the valve device 4' correspondingly inexpensive.

In the valve device 4" according to FIG. 6, on the other hand, ABS valves are still provided downstream of the pneumatic interface 30, which maintain an adjusted brake pressure or can reduce it by venting. Thus, the solenoid valves 276 and 278, which are responsible in the valve device 4' for maintaining or reducing the brake pressure, are not present in the valve device 4". Nevertheless, the valve devices 4' and 4" comprise the identical housing 36', so that the common housing 36' can be produced inexpensively in large quantities.

In the valve block 34" the valves 276 and 278 are omitted compared to the valve block 34'. Gaps or free spaces for accommodating the solenoid valves 276 and 278 in the valve device 4' can be filled in the valve device 4", for example, with dummy bodies or spare valve bodies or can be sprayed with a setting material. Air ducts or compressed air lines 280 and 282 can thereby be advantageously provided in the valve block 34", by which the internal pneumatic interfaces 242 and 254 as well as 244 and 252 can be connected to each other. The valve device 4" thus behaves like the valve device 4' in the event that the solenoid valves 276 and 278 are carrying no current for long periods.

The valve blocks 34' and 34" can contain a pressure sensor as with valve block 34. However, the pressure sensor is also unnecessary in the valve devices 4' and 4" used for an ABS in certain embodiments of the invention, in particular if a pressure sensor is provided in the brake confirmation device 6'.

It will be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A modular device system for a pneumatically operated vehicle brake system for a road vehicle, the modular valve device system comprising:
    a plurality of valve devices, the plurality of valve devices comprising:
        a first valve device variant being configured for use in effecting an electronically controlled embodiment of the pneumatically operated vehicle brake system; and
        a second valve device variant being configured for use in effecting a pneumatically controlled embodiment of the pneumatically operated vehicle brake system,
    wherein the first valve device variant and the second valve device variant have substantially identical mechanical fixing points and substantially identical pneumatic interfaces,
    wherein the first valve device variant and the second valve device variant are adapted to be interchangeably received in an accommodating structure of the pneumatically operated vehicle brake system, and
    wherein each of the plurality of valve devices is configured to adjust a pneumatic pressure deliverable to at least one brake of the pneumatically operated vehicle brake system, and
    wherein the first valve device variant and the second valve device variant can be used alternatively in the pneumatically operated vehicle brake system.

2. The system as claimed in claim 1, wherein the first valve device variant and the second valve device variant have substantially identical housings and comprise solenoid valve blocks dimensioned to be at least one of mechanically connected to the housings via substantially identical fixing devices and pneumatically connected to the housings via substantially identical internal pneumatic interfaces.

3. The system as claimed in claim 1, wherein at least one of the first valve device variant and the second valve device variant is a modulator.

4. The system as claimed in claim 1, wherein the first valve device variant and the second valve device variant are exchange components of a set of exchange components comprising the first valve device variant and the second valve device variant, at least two variants of each of a brake actuator, a trailer control valve device, and an electronic controller,
    wherein a first brake actuator variant includes a brake value transmitter,
    wherein the first brake actuator variant, the first valve device variant, a first trailer control valve device variant, and a first electronic controller variant are configured for use in effecting the electronically controlled embodiment of the pneumatically operated vehicle brake system,
    wherein the second brake actuator variant comprises a brake valve,
    wherein the second brake actuator variant, the second valve device variant, a second trailer control valve device variant, and a second electronic controller variant are configured for use in effecting the pneumatically controlled embodiment of the pneumatically operated vehicle brake system,
    wherein the first and second brake actuator variants, the first and second trailer control valve device variants, and the first and second electronic controller variants respectively comprise substantially identical mechanical fixing points and substantially identical electrical interfaces,
    wherein the first valve device variant and the second valve device variants further comprise substantially identical electrical interfaces, and
    wherein the at least one first and second brake actuator variants and the first and second trailer control valve device variants respectively comprise a substantially identical pneumatic interfaces.

5. The system as claimed in claim 1, further comprising at least one of (i) mountings and pipes, (ii) hoses and cables, and (iii) cable looms configured for use in effecting both the electronically controlled embodiment of the pneumatically operated vehicle brake system and the pneumatically controlled embodiment of the pneumatically operated vehicle brake system.

6. The system as claimed in claim 1, wherein the first valve device variant and the second valve device variants are exchange components of a set of exchange components,
    wherein at least one of the first valve device variant and another of the exchange components comprises a brake system component and an adapter at least one of mechanically and pneumatically and electrically connected to the brake system component, and
    wherein the adapter comprises one of the (i) mechanical fixing points, (ii) pneumatic interfaces, and (iii) electrical interfaces of the at least one of the first valve device variant and the another of the exchange components.

7. The system as claimed in claim 2, wherein the first valve device variant is one of an axle modulator and a wheel modulator, and wherein the solenoid valve block of the first valve device variant comprises a triple solenoid valve block with three solenoid valves by which a brake pressure is electropneumatically adjustable according to a redundant pressure when electropneumatic brake pressure adjustment capability fails.

8. The system as claimed in claim 2, wherein the second valve device variant is a wheel modulator that includes a triple solenoid valve block with three solenoid valves by which a brake pressure is pneumatically adjustable according to a target brake pressure and electropneumatically adjustable by one of an anti-lock brake system and a drive slip control device.

9. The system as claimed in claim 2, wherein the second valve device variant is an axle modulator that includes a single solenoid valve block with a solenoid valve with which a brake pressure is adjustable as a greater of a pressure generated pneumatically according to a target brake pressure and a pressure generated electropneumatically by a drive slip control device.

10. The system as claimed in claim 2, wherein the second valve device variant is a relay valve by which a brake pressure is adjustable according to a target brake pressure.

11. The system as claimed in claim 7, further comprising pneumatically connectable air ducts arranged in the housings.

12. The system as claimed in claim 1, further comprising a brake actuator, wherein one of (i) the brake actuator includes a brake value transmitter and is configured for use in effecting the electronically controlled embodiment of the pneumatically operated vehicle brake system, and (ii) the brake actuator includes a brake valve and is configured for use in effecting the pneumatically controlled embodiment of the pneumatically operated vehicle brake system.

13. The system as claimed in claim 1, further comprising a trailer control valve device,
wherein the trailer control valve device is one (i) a first trailer control valve device,
wherein the trailer control valve device is one of (i) a first trailer control valve device variant configured for use in effecting the electronically controlled embodiment of the pneumatically operated vehicle brake system and comprising an electrical interface and pneumatic interfaces, and (ii) a second trailer control valve device variant configured for use in effecting the pneumatically controlled embodiment of the pneumatically operated vehicle brake system and comprising pneumatic interfaces.

14. The system as claimed in claim 1, further comprising a control device, wherein the control device is one of (i) a first control device variant configured for use in effecting the electronically controlled embodiment of the pneumatically operated vehicle brake system, and (ii) a second control device variant configured for use in effecting the pneumatically controlled embodiment of the pneumatically operated vehicle brake system.

15. A vehicle brake system, comprising at least one exchange component of the set of exchange components of the system as claimed in claim 4.

16. A vehicle, comprising the vehicle brake system as claimed in claim 15.

17. A method for equipping a vehicle brake system, comprising using at least one exchange component of the set of exchange components of the system as claimed in claim 4.

18. The method as claimed in claim 17, wherein using at least one exchange component is effected using an adapter.

19. A method for converting a vehicle brake system, comprising replacing at least one component of the brake system with at least one exchange component of the set of exchange components of the system as claimed in claim 4.

20. The system as claimed in claim 1, wherein the second valve device variant includes a relay valve.

21. The system as claimed in claim 8, wherein pneumatically connectable air ducts are arranged in the housings of the first valve device variant and the second valve device variant.

22. The system as claimed in claim 9, wherein pneumatically connectable air ducts are arranged in the housings of the at least one first and second valve device variants.

23. The system as claimed in claim 10, wherein pneumatically connectable air ducts are arranged in the housings of the first valve device variant and second valve device variants.

24. The system as claimed in claim 1, wherein relative positions of first and second ones of the mechanical fixing points of the first valve device variant are substantially identical to relative positions of first and second ones of the mechanical fixing points of the second valve device variant.

25. The system as claimed in claim 1, wherein relative positions of first and second ones of the pneumatic interfaces of the first valve device variant are substantially identical to relative positions of first and second ones of the pneumatic interfaces of the second valve device variant.

26. The system as claimed in claim 1, wherein the electronically controlled embodiment of the pneumatically operated vehicle brake system effects braking based on brake values electronically generated in response to operation of a brake pedal of the brake system, and wherein the pneumatically controlled embodiment of the pneumatically operated vehicle brake system effects braking based on pneumatic pressure adjustments resulting from operation of the brake pedal.

* * * * *